No. 711,023. Patented Oct. 14, 1902.
C. T. THOMAS.
FERTILIZER DISTRIBUTER ATTACHMENT FOR PLOWS.
(Application filed Oct. 21, 1901.)
(No Model.)

Witnesses:
J. Stewart Bowen
J. W. Garner

C. T. Thomas Inventor
by C. A. Snow & Co
Attorneys

THE NORRIS PETERS CO., PHOTO-LITHO., WASHINGTON, D. C.

UNITED STATES PATENT OFFICE.

CHARLES T. THOMAS, OF MOUNTAIN ISLAND, NORTH CAROLINA, ASSIGNOR OF TWO-THIRDS TO R. P. ROBINSON AND W. N. CAVIN, OF MOUNT HOLLY, NORTH CAROLINA.

FERTILIZER-DISTRIBUTER ATTACHMENT FOR PLOWS.

SPECIFICATION forming part of Letters Patent No. 711,023, dated October 14, 1902.

Application filed October 21, 1901. Serial No. 79,468. (No model.)

*To all whom it may concern:*

Be it known that I, CHARLES T. THOMAS, a citizen of the United States, residing at Mountain Island, in the county of Gaston and State of North Carolina, have invented a new and useful Fertilizer-Distributing Attachment for Plows, of which the following is a specification.

My invention is an improved fertilizer-distributing attachment for plows, adapted to be attached to the beam of a plow in advance of the share thereof and to distribute fertilizer in advance of the share while the plow is in operation in such manner that the fertilizer will be buried and covered over by the mold overturned by the plow, thus enabling a field to be plowed and fertilized at a single operation.

My invention consists in the peculiar construction and combination of devices hereinafter fully set forth and claimed.

Figure 1:
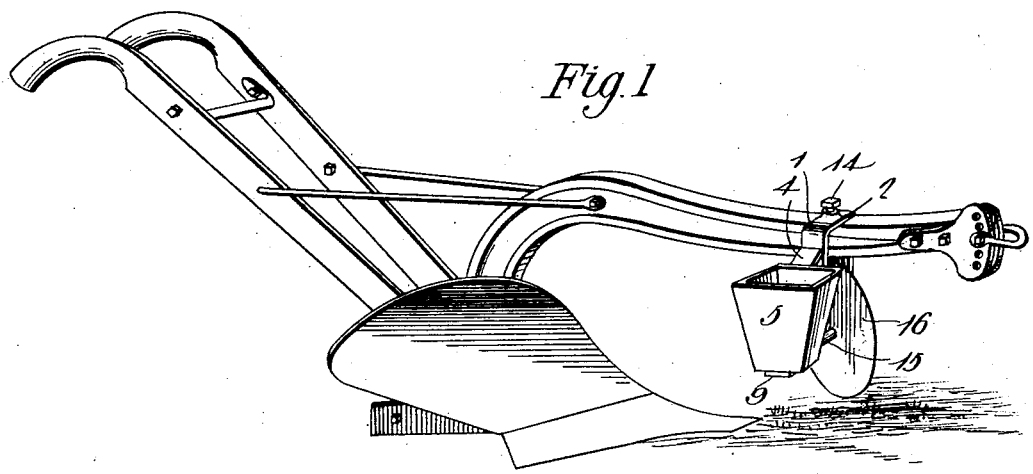
Figure 2:
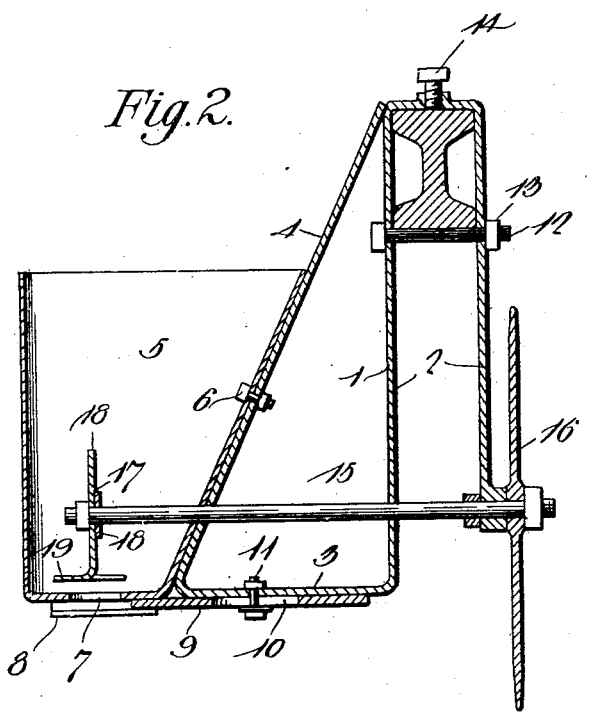
Figure 3:
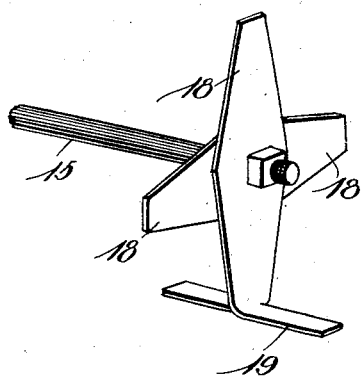

In the accompanying drawings, Figure 1 is a perspective view of a turning-plow of ordinary construction provided with my improved fertilizer-distributing attachment. Fig. 2 is a vertical transverse sectional view of my improved fertilizer-distributing attachment, showing the same disposed in operative position on a plow-beam. Fig. 3 is a detail perspective view of the revoluble stirrer which operates in the fertilizer-hopper.

In the embodiment of my invention I provide a bracket 1, which is formed of a single bar of metal bent to form an inverted-U-shaped clamp 2, which is adapted to be placed astride of a plow-beam and to form a laterally-extending horizontal arm 3 at the lower end of one side of the said clamp, at the outer end of which arm is an upturned inclined arm 4. On the outer side of the said arm 4 is secured the correspondingly-inclined side of a fertilizer-hopper 5. The same is here shown as secured to the arm 4 by a bolt 6. In the lower side of the hopper is a discharge-opening 7, and under the bottom of the hopper are guideways 8. An adjusting and cut-off slide-plate 9 bears against the lower side of the arm 3 and the bottom of the hopper and is engaged by the guideways 8. That portion of the said plate 9 which is disposed under the arm 3 is provided with a longitudinal slot 10. A bolt 11 connects the said plate to the said arm 3 and passes through the said slot 10. Thereby the said plate is adapted to be moved in position to either entirely cut off the discharge of fertilizer through the opening 7 or to open the latter to any desired extent in order to regulate the quantity of fertilizer discharged from the hopper.

The standard portions of the clamp 2 are connected together by a bolt 12, which when the attachment is secured to a plow-beam extends under the latter. By adjusting the nut 13 of said clamping-bolt the clamp 2 may be secured firmly to the beam, as will be understood. I also provide a clamping-screw 14, which is disposed in a threaded opening in the upper side of the clamp portion of the bracket and is adapted to engage the upper side of the plow-beam.

A shaft 15 has its bearings in the standard portions of the clamp 2, in the arm 4 of the bracket, and in the inner inclined side of the fertilizer-hopper. At one end of the said shaft is secured a circular driving element 16, which is adapted to rotate by contact with the ground when the plow is in motion and which is disposed and operates in advance of the cutting landside edge of the plow. In the form of my invention here shown the driving element 16 is a colter-disk, which coacts with the plowshare in cutting the mold which is overturned by the plowshare. A revoluble stirrer 17 is secured to the shaft 15 and disposed in the fertilizer-hopper at a point directly above the discharge-opening 7 thereof. The said revoluble stirrer comprises radial spurs 18, at the outer end of one of which is a horizontally-disposed stirring arm or blade 19, which is adapted to operate immediately above the bottom of the hopper.

From the foregoing description and by reference to the drawings it will be understood that fertilizer carried in the hopper 5 will be discharged therefrom onto the soil immediately in advance of the plowshare when the plow is in operation and that the plowshare in overturning the mold will bury and effectually cover the fertilizer out of the reach of the wasting influences of the sun and rain. Hence by providing a turning-plow with one of my improved fertilizer-distributing attachments a field may be plowed and fertilized at a single operation.

Having thus described my invention, I claim—

1. A fertilizer-distributer attachment for plows, comprising a bracket having an inverted-U-shaped clamp adapted to set astride a plow-beam and formed integrally with a supporting-arm, a hopper secured on said supporting-arm, a shaft having its bearings in said bracket, a driving element on said shaft rotated by contact with the soil, and a stirrer in said hopper and operated by said shaft, substantially as described.

2. A fertilizer-distributer attachment of the class described, comprising a bracket formed of a single bar bent to form an inverted-U-shaped clamp 2 adapted to set astride of a plow-beam, a laterally-extending arm 3 at one side of said clamp, at the lower end thereof, and an inclined arm 4 extending upwardly from the outer end of said arm 3 to the top of said clamp, a hopper secured on said inclined arm 4, a shaft mounted in bearings in said bracket and a revoluble driving element and stirring element on said shaft, said stirring element being disposed in said hopper, and said driving element being rotated by contact with the soil, substantially as described.

In testimony that I claim the foregoing as my own I have hereto affixed my signature in the presence of two witnesses.

CHARLES T. THOMAS.

Witnesses:
  A. A. FARRAR,
  J. J. FARRAR.